(No Model.)  2 Sheets—Sheet 2.
C. W. SALADEE.
VEHICLE SPRING.
No. 305,850. Patented Sept. 30, 1884.
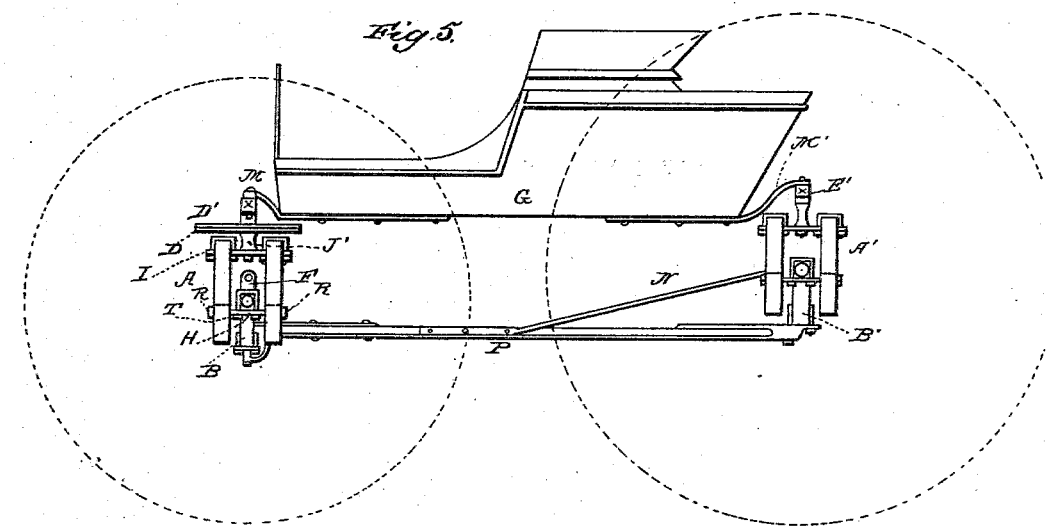
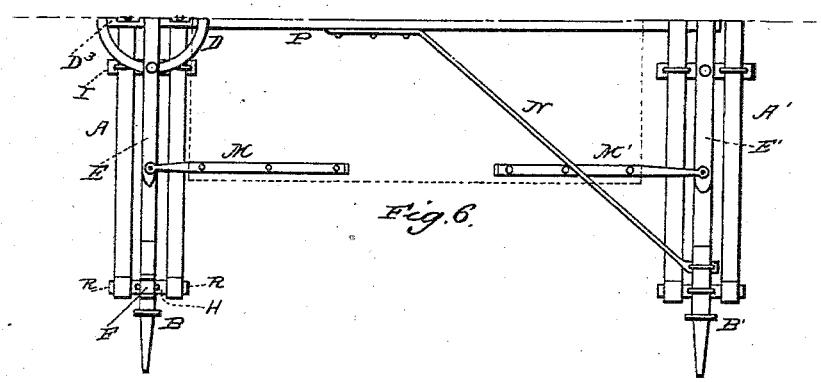
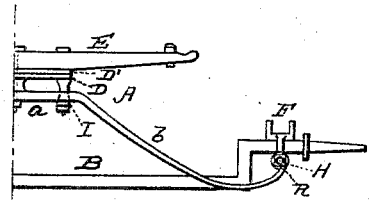 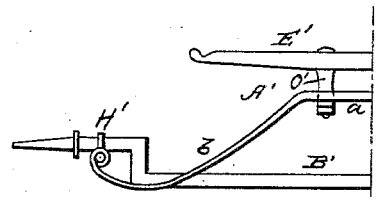
WITNESSES  
INVENTOR  
Cyrus W. Saladee,  
by Anderson & Smith  
his ATTORNEYS

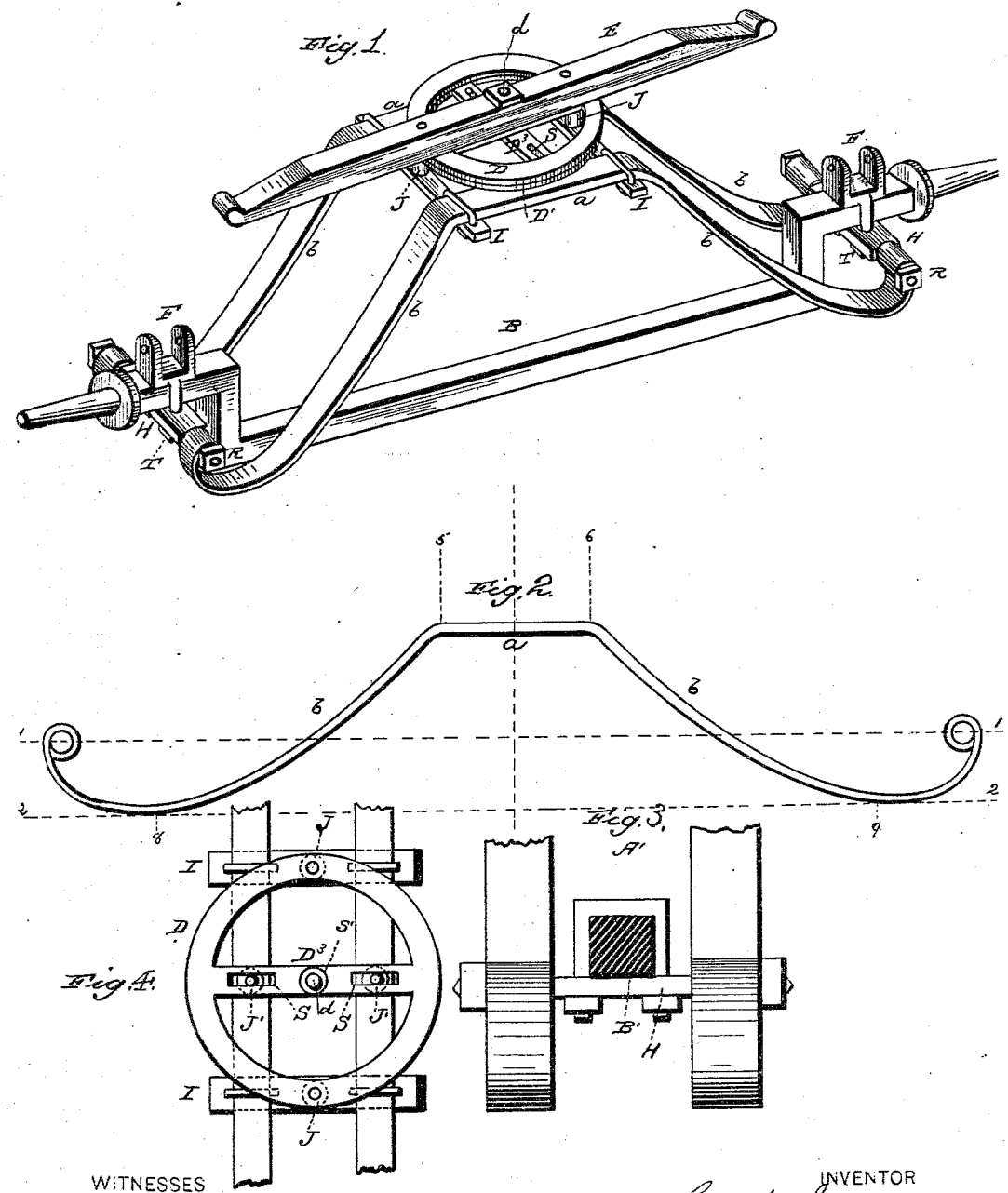

UNITED STATES PATENT OFFICE.

CYRUS WELLINGTON SALADEE, OF WOLCOTTVILLE, CONNECTICUT.

VEHICLE-SPRING.

SPECIFICATION forming part of Letters Patent No. 305,850, dated September 30, 1884.

Application filed March 15, 1884. (No model.)

*To all whom it may concern:*

Be it known that I, CYRUS W. SALADEE, a citizen of the United States, residing at Wolcottville, now Torrington, in the county of Litchfield and State of Connecticut, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has relation to new and useful improvements on vehicle-springs and their connections with reference to the proper support of the body.

The invention consists, first, in the peculiar form of the spring, which is horizontally straight in its middle portion, from the ends of which its side portions extend downward and outward in long sweeping branches of increasing curvature to the eye-bearings at the ends, which are directed vertically upward, or nearly so, whereby the employment of swinging links or compensating scrolls turning more than once around the terminal eyes is avoided; second, in the combination, with transverse springs of the character described, of trunnion-bars clipped on the axle at right angles thereto, the bearings of said trunnion-bars projecting horizontally from the axle to receive the terminal eyes of the springs; third, in the combination, with a cranked axle, of a self-compensating spring of the character herein described, whereof the trunnion-bearings are connected to the crank ends and the curved branches descend to the level of the depressed middle portion of the axle; fourth, in the combination, with the transverse springs of the character described, of the devices whereby the lower circle of the fifth-wheel is connected to the middle horizontal portion of the springs, and at the same time elevated above the same; fifth, in the combination, with the front axle, of a shaft-coupling having its seat on the top of the axle and its prongs passing down the opposite sides of the axle, and serving to secure to the under side of the axle the trunnion plate or bar, from which are suspended the transverse springs of the front platform; sixth, in the combination, with the axle, of a trunnion bar or plate at right angles thereto, and secured to the under side of the axle by a clip embracing the axle and passing through perforations in the trunnion-plate; seventh, in the combination, with the transverse springs of the rear platform having the straight middle portions hereinbefore described, of the rear transverse bar secured between the springs upon bearings supporting it above the middle portions of said springs at a proper height; and, eighth, in the combination, with the front and rear spring-platforms, of a vehicle-body supported between the platforms by braces or body-loops extending from said body forward and rearward to the respective spring-platforms, all as hereinafter set forth.

In the accompanying drawings, Figure 1 is a representation in perspective of a front view of the front axle, its springs, fifth-wheel, and other parts belonging thereto in position. Fig. 2 is a front view of one of the springs detached, showing its peculiar form. Fig. 3 is a detail view showing, upon a larger scale, the end portion of the rear axle in section, the clip embracing the same, and the trunnion-plate secured to said plate and in engagement with the terminal loops of the springs. Fig. 4 is an enlarged plan view of the lower circle of the fifth-wheel, showing the devices whereby it is attached to the flat middle portions of the springs over the front axle. Fig. 5 represents a side view of a light vehicle, showing the front and rear spring-platforms and the devices whereby the body is suspended between the same. Fig. 6 represents a top view of half of the running-gear without the body and wheels. Fig. 7 is a front view of one-half of the front end of the running-gear, and Fig. 8 is a rear view of one-half of the rear end of the running-gear.

In all the figures of the drawings similar letters of reference indicate corresponding parts.

The letters B and B' respectively represent the front and rear axles of the vehicle, said axles in the construction illustrated being "cranked" or having a depressed middle portion and angular ends, as shown.

P denotes the reach, having its ends connected, respectively, to the centers of the front and rear axles, and N represents an axle-stay attached to the rear axle near its shoulder and extending obliquely to the reach, to which it is secured.

G indicates the body of a vehicle, which, in this instance, is a buggy-body suspended by arms or body-loops between the front and rear duplex spring supports or platforms, A A and A' A', which are connected to their respective axles in the following manner: To the front axle, near the shoulders thereof, upon the crank ends, are secured the shaft-couplings F, the clip-prongs of which pass down on each side of the axle and through the trunnion-plates H, which are thereby firmly secured to the under side of the axle at right angles to the same, the nuts T forming the fastenings, as shown. In this construction the shaft-coupling F has its seat upon the top of the axle. The opposite ends of the trunnion-plate are turned down to form round bearings, the ends of which are threaded to receive nuts R, whereby the terminal eyes or loops of the springs, when seated on said bearings, are retained. The transverse springs A and A' are of similar form, which is indicated in Fig. 2 of the drawings. The form of the spring is straight or horizontal in its middle portion, $a$, or between the lines 5 and 6. From the ends of the middle portion the lateral branches $b$ extend downward and outward in curves of single sweep and gradually-increasing sharpness to the terminal eyes, to which the springs rise in the vertical or nearly vertical direction, the level of the terminal eyes being upon the horizontal line 1, and that of the lowest points of curvature upon the horizontal line 2, which is about level with the depressed middle portion of the axle. These springs are designed to be self-compensating in their action, while they are simple in form and of light and elegant proportions. Their simplicity at the points of suspension gives them an especially neat appearance. No swinging links are employed, and the rattling noise attendant upon the use of such links is avoided; nor with this spring is it necessary to use a scroll of several turns around the point of suspension, which, if it facilitates the compensating action of the spring under pressure, presents a bulky and cumbersome appearance, and is comparatively weak for the amount of metal involved.

In the use of the form of spring which is herein described the central portion may be vertically depressed, and this will cause the curves of the outer or lateral branches to be increased, especially along the portions indicated at 8 and 9, whereby the necessary compensation is effected without the employment of unnecessary parts or material.

D and D' respectively represent the upper and lower circles of the fifth-wheel. The bottom circle, D, is formed with a central cross-bar, $D^3$, through which are made on each side of its center the oblong slots S S, immediately above the springs A A. Spool-bearings J' are interposed between the flat central portions of the springs and the cross-bar $D^3$, and bolts passing down through the slots of the cross-bar, the spools, and the springs serve to securely unite these parts. The middle portions of the springs are connected and braced to each other by means of lateral cross-bars I, which are clipped or bolted to the under side of the springs at a distance from each other equal to the diameter of the fifth-wheel. Centrally between the springs a spool, J, is interposed between each cross-bar I and the circle D, and a bolt having a countersunk head extends through the circle and bar, securing them firmly together. It will be seen that the lower circle, D, rests upon four spool-bearings, whereby it is raised above the springs. This vertical distance above the springs can be varied to suit the requirements of the construction by using spools of different lengths. It is a very simple and inexpensive means of adjusting the height of the circle above the springs. It is, moreover, strong, and yet allows the middle portions of the springs a little play, which is advisable. The slots of the cross-bar of the circle are designed to facilitate the adjustment of the springs toward or from each other, as may be required. At the center of the cross-bar $D^3$ is provided a strong pivot-sleeve or hollow boss, $s'$, which extends up through an opening in the cross-bar of the upper circle, D', to which the front spring-bar, E, is secured, and a king-bolt, $d$, passes down through the bar and hollow boss. The rear transverse springs, A' A', are connected to the rear axle by a similar arrangement of trunnion-plates and clips to that already described relative to the front springs; but instead of utilizing the clip-prongs of a shaft-coupling to secure the trunnion-plates to the axle a saddle-clip, H', is employed. The rear spring-bar, E', is supported in a raised position between the springs A' A' by means of brackets, or by spools O', interposed between the bottom of the spring-bar and the cross-bars I, which connect the springs. The body, if of the proper style and proportions to this end, is suspended between the front and rear spring-platforms by means of the arms or body-loops M and M', as shown; but if it be a long or "piano-shaped" body, it is made to rest immediately on the spring-bars in the usual manner.

By employing the cranked axle, substantially as shown in the drawings, the reach and the body can be carried lower than when the axles are straight or only slightly depressed at their middle portions, without diminishing the length or play of the springs; but if it should be desired to carry the springs higher, their points of suspension may be arranged above the level of the axle-arms instead of below.

By suspending the body by loops connected at each end to parallel connected transverse springs I secure a very rigid structure, tending to prevent any forward or backward play of the body and twisting of the spring-supports.

I do not limit the application of the form of self-compensating springs herein shown and described to any special class of vehicles, and I may here state that I intend to use them in the construction of road-carts and wagons; nor do I limit this invention to the employment of two connected springs to each axle, for in the lighter classes of pleasure-vehicles I may employ but one spring of the form shown in connection with each axle, suspending it from either side of the axle upon a suitable trunnion-bearing.

Having described this invention, what I claim, and desire to secure by Letters Patent, is—

1. The transverse self-compensating vehicle-spring described, having the straight horizontal middle portion and the long sweeping branches of increasing curvation extending downward and outward and upward from the ends of said middle portion, and terminating without scrolls in eyes at the ends receiving stationary bearings, substantially as specified.

2. The combination, with transverse self-compensating springs of the form described, of trunnion-bars clipped to and suspended from the axle at right angles thereto, and projecting on each side of the axle to receive the terminal eyes of the springs, substantially as specified.

3. The combination of a crank-axle and a spring parallel thereto rising at the center and connected at the ends to bearings supported by the upper part of the axle, substantially as described.

4. The combination of a crank-axle and springs parallel to and on opposite sides of the same, each rising in the center and connected at the ends to bearings arranged transversely to and extending from opposite sides of the upper part of the axle, substantially as described.

5. The combination, with a crank-axle, of parallel springs on opposite sides connected at the ends to transverse bearings projecting from opposite sides of the axle and rising at the center and opposite the bolster, substantially as described.

6. The combination of the crank-axle, springs parallel thereto on opposite sides thereof, rising at the center, and clips on the upper part of the axle, having lateral bearings to receive eyes at the ends of the springs, substantially as described.

7. The combination, with a cranked axle, of a transverse self-compensating spring of the character herein described, whereof the trunnion-bearings engaging its terminal eyes are secured to the crank ends of the axle and the curved lateral branches descend to the level of the depressed middle portion of the axle, substantially as specified.

8. The combination, with transverse springs having straight horizontal middle portions, and arranged parallel to each other in front and in rear of the axle, of the lower circle of the fifth-wheel, having a central cross-bar and lateral cross-bars clipped to and bracing the springs and supporting the edge of the fifth-wheel, substantially as specified.

9. The combination, with the parallel supporting-springs, of the lower circle of the fifth-wheel, and intermediate spool bearings and bolts, substantially as described.

10. The combination, with the transverse springs A and the front axle, of a shaft-coupling having its seat on the top of the axle, and its prongs passing down the opposite sides of the axle and supporting the bearing below the axles from which are suspended the springs A, substantially as specified.

11. The combination, with the transverse springs of the rear platform, having the straight middle portions hereinbefore described, of the rear transverse bar secured between the springs upon bearings supporting it between and above the middle portions of said springs, substantially as specified.

12. The combination, with the front and rear duplex spring platforms, of a vehicle-body supported between the platforms by braces or body-loops extending from said body forward and rearward to the respective spring-platforms, substantially as specified.

13. The combination of the parallel lateral adjustable springs elevated at the centers, and of vertical bolts or supports for the fifth-wheel, the lower part of the fifth-wheel being slotted for the passage of said bolts, substantially as described.

14. The combination of the supporting-spring, fifth-wheel, king-bolt or pivot extending through the center of and above the fifth-wheel, and bolster supported by the said pivot, substantially as described.

15. The combination, in a vehicle, of two parallel transverse connected springs arranged above each axle, and a body suspended between the front and rear spring-supports by loops extending from the ends of the body and connected to said supports, substantially as described.

In testimony whereof I affix my signature in presence of two witnesses.

CYRUS WELLINGTON SALADEE.

Witnesses:
  CHAS. L. MCNEIL,
  FREDERICK A. BARTLETT.